April 28, 1925.
R. MANCHA
1,535,175
ELECTRIC STORAGE BATTERY LOCOMOTIVE
Filed Jan. 28, 1924     2 Sheets-Sheet 1
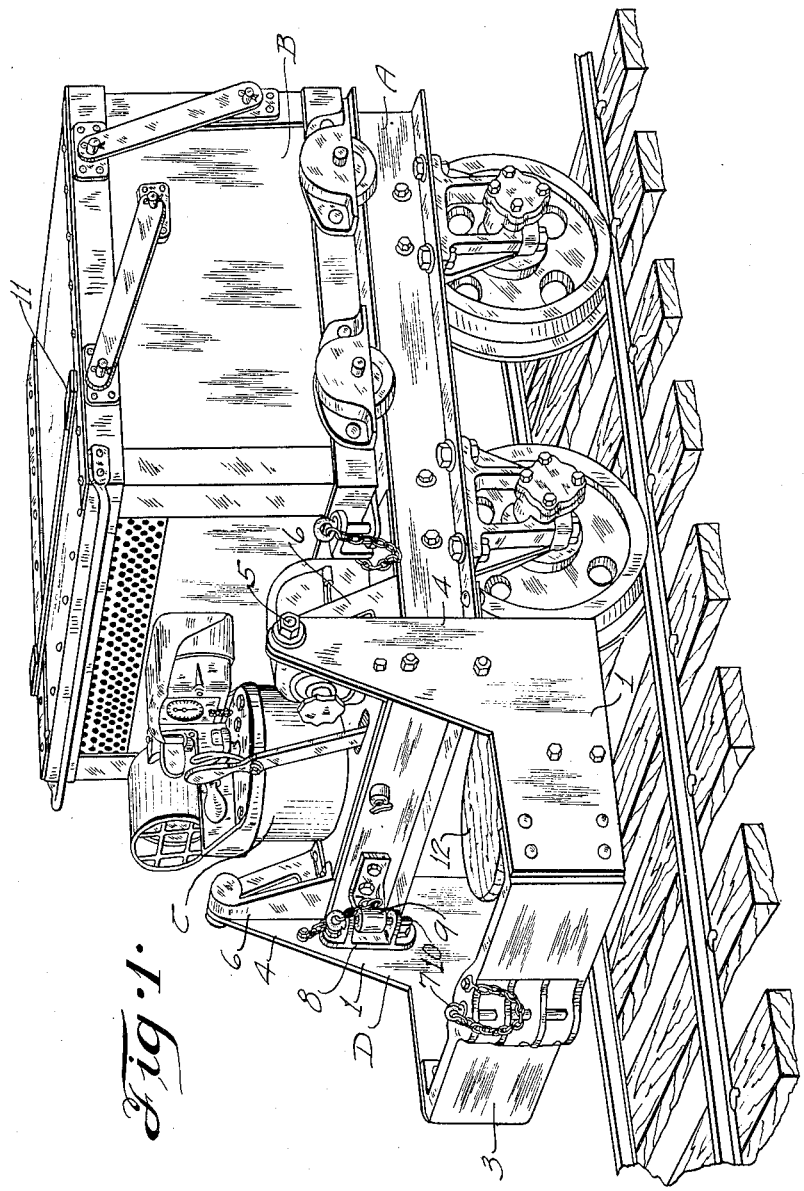
INVENTOR
Raymond Mancha.
By Bakewell & Church
ATTORNEYS April 28, 1925. 1,535,175
R. MANCHA
ELECTRIC STORAGE BATTERY LOCOMOTIVE
Filed Jan. 28, 1924 2 Sheets-Sheet 2
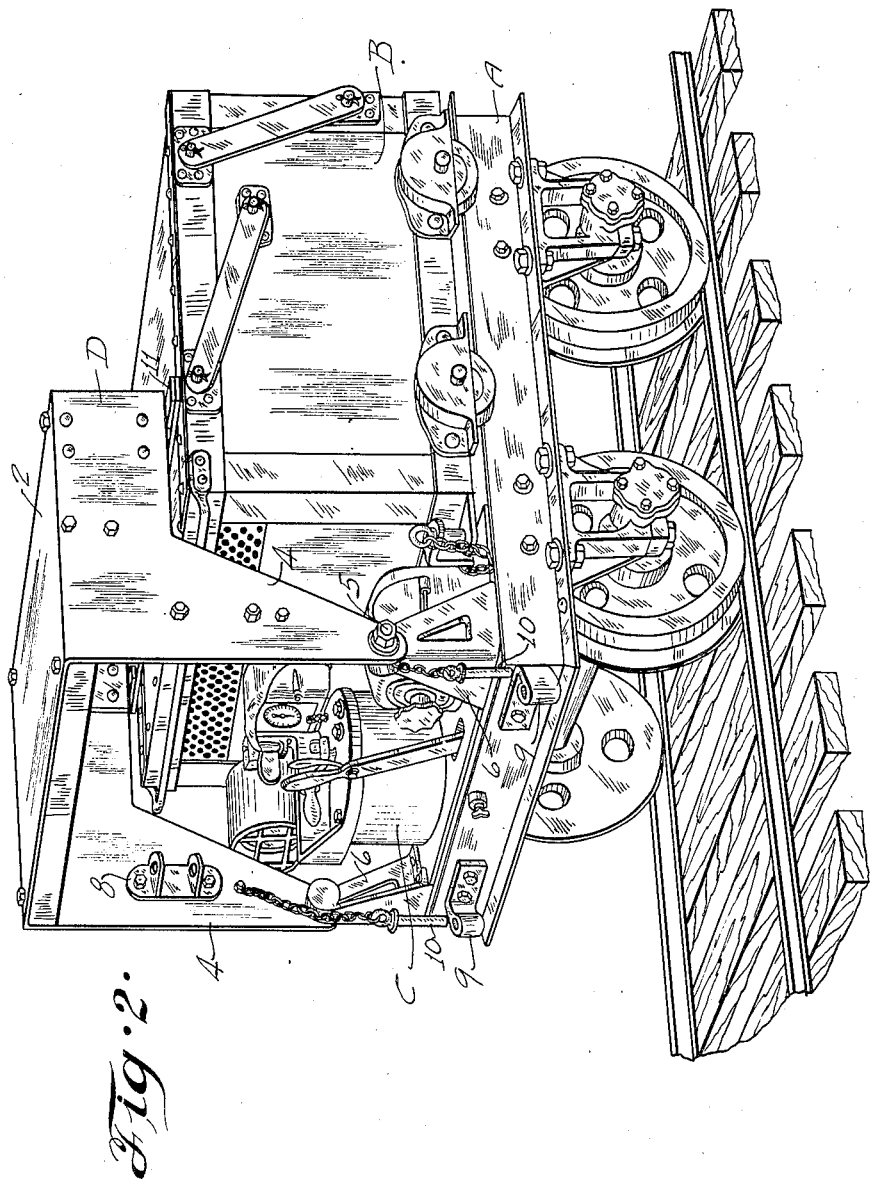
INVENTOR
Raymond Mancha.
BY Bakewell & Church
ATTORNEYS Patented Apr. 28, 1925.

1,535,175

UNITED STATES PATENT OFFICE.

RAYMOND MANCHA, OF ST. LOUIS, MISSOURI, ASSIGNOR TO MANCHA STORAGE BATTERY LOCOMOTIVE COMPANY, OF ST. LOUIS, MISSOURI, A CORPORATION OF DELAWARE.

ELECTRIC STORAGE-BATTERY LOCOMOTIVE.

Application filed January 28, 1924. Serial No. 689,038.

*To all whom it may concern:*

Be it known that I, RAYMOND MANCHA, a citizen of the United States, residing at St. Louis, Missouri, have invented a certain new and useful Improvement in Electric Storage-Battery Locomotives, of which the following is a full, clear, and exact description, such as will enable others skilled in the art to which it appertains to make and use the same.

This invention relates to electric storage battery locomotives.

The storage battery locomotives that are now used in mines equipped with narrow entries and mines equipped with a cage or skip on which the locomotive is transferred from one level to another level consists of one unit that contains the motor, controller and compartment for the motorman, and a separate unit that contains the storage battery used to operate the motor. In transferring such a locomotive from one level to a different level it is necessary to disconnect these two units because the overall length of both units is too great to permit said units to be run onto a cage or skip when they are coupled together. The operation of disconnecting the two units each time the locomotive is to be run onto a cage and thereafter coupling said units together after the locomotive has been removed from the cage, involves considerable trouble and loss of time, and the object of my invention is to eliminate this trouble and loss of time in operating storage battery locomotives that are designed for use in mines equipped with narrow entries and skips or cages on which the locomotives are transferred from one level to another.

To this end I have devised an electric storage battery locomotive consisting of a single unit comprising a motor, a controller, a storage battery and a motorman's compartment or platform constructed in such a way that a part of the locomotive can be moved easily into a position to reduce the overall length of the locomotive sufficiently to enable it to be run onto a cage or skip, and thereafter restored to its normal position after the locomotive has been run off the cage. The movable or shiftable part of the locomotive just referred to preferably consists of a compartment or platform for the motorman in charge of the locomotive and said movable element is combined with the chassis of the locomotive in such a way that it can be moved into and out of its operative position in a fraction of the time required to uncouple two units, run said units onto a cage, then remove them from the cage and thereafter couple said units together.

Figure 1 of the drawings is a perspective view of an electric storage battery locomotive constructed in accordance with my invention, showing the motorman's compartment or platform arranged in its operative position; and Figure 2 is a similar view, showing the motorman's compartment or platform arranged in its inoperative position.

Referring to the drawings A designates as an entirety the chassis of a locomotive composed of a suitable frame equipped with wheels, B designates a battery box on said chassis that contains the storage battery used to operate the motor (not shown) of the locomotive, C designates the controller box on said chassis and D designates as an entirety a movable or shiftable element on one end of said chassis that is adapted to be used as a compartment or platform for the motorman in charge of the locomotive. The particular design or construction of the chassis, the battery box and the controller is immaterial, and the motorman's compartment or platform D can be constructed in various ways and mounted on the chassis of the locomotive in various ways without departing from the spirit of my invention. The only requisites are:

(1st) A chassis of such overall length that it can be run onto a conventional mine cage or skip; and (2nd) A shiftable or movable element at one end of the chassis that can be used to support the motorman when the locomotive is in operation and which can be shifted or moved into an inoperative position so as to reduce the overall length of the complete unit sufficiently to permit it to be positioned on a mine cage or skip.

In the form of my invention herein shown the motorman's compartment D is pivotally mounted on one end of the chassis of the locomotive in such a way that when it is arranged in its operative position, shown in Figure 1, it forms an extension on one end of the chassis that adds materially to the overall length of the chassis, and when it is arranged in its inoperative position, shown in Figure 2, it is located within the marginal limits of the chassis in superimposed relation with the battery box B on the chassis. Said motorman's compartment D is of rectangular shape in general outline and is composed of two side members 1 connected together by a floor 2 and an end sill 3 and provided with upwardly-projecting arms 4 whose upper ends are pivotally connected by bolts or other suitable fastening devices 5 to brackets or uprights 6 on the chassis of the locomotive. When the element D is in its operative position, shown in Figure 1, it forms a substantial supporting structure for the motorman and enables the motorman to occupy a position in close proximity to the controller box C and the other elements used to govern the operation of the locomotive, and when said element is in its inoperative position, as shown in Figure 2, it laps over the battery box B, thus reducing the overall length of the complete unit to the length of the chassis A of the locomotive.

The end sill 3 is preferably equipped with a removable coupling pin 7 by which a draw bar can be detachably connected to the locomotive, and means is provided for holding the motorman's compartment D rigid with respect to the chassis of the locomotive when said compartment is arranged in its operative position. In the locomotive herein shown the upwardly-projecting arms 4 on the side members 1 are provided with bifurcated elements 8 arranged so that they will straddle lugs 9 on the end member of the frame of the chassis of the locomotive, thereby enabling pins 10 to be inserted in aligned holes in said bifurcated elements 8 and lugs 9. When the compartment D is swung upwardly into its inoperative position, shown in Figure 2, gravity maintains it in superimposed relation with the battery box and causes said compartment to bear upon buffers or stops 11 on the battery box B. If desired, the compartment D can be equipped with a seat 12 for the motorman, arranged so that the various devices used to govern the operation of the locomotive are within easy reach of the motorman. Normally, the shiftable or movable element D is arranged in the position shown in Figure 1 so as to form a supporting structure for the motorman in charge of the locomotive. When the locomotive is to be transferred to a different level the locking pins 10 are withdrawn from the co-operating devices 8 and 9 on the element D and on the chassis of the locomotive, and said element D is then swung upwardly into the position shown in Figure 2 so as to reduce the overall length of the unit, and thus permit it to be run onto a conventional mine cage or skip. When the cage reaches the level to which the locomotive is to be transferred, the locomotive is run off the cage and the element D is restored to its former position and locked to the chassis A by inserting the locking pins 10 in the co-operating devices 8 and 9.

From the foregoing it will be seen that with an electric storage battery locomotive of the construction above described the labor and time involved in transferring the locomotive from one level to a different level is considerably less than with a two unit locomotive of the type heretofore used in mines equipped with narrow entries and cages, owing to the fact that the locomotive is constructed in the form of a single unit that comprises a motorman's platform or compartment which can be moved or shifted into a position wherein the overall length of the unit is reduced sufficiently to enable it to be positioned on a conventional mine cage or skip.

Having thus described my invention, what I claim as new and desire to secure by Letters Patent is:

1. A storage battery locomotive, comprising a chassis, a battery box on said chassis, and a movable operator's platform which is adapted to be arranged in an operative position wherein it forms an extension on one end of the chassis and in an inoperative position wherein it is positioned above said battery box.

2. A storage battery locomotive provided at one end with a shiftable supporting structure for the motorman in charge of the locomotive, and means for locking said supporting structure in its operative position.

3. A storage battery locomotive, comprising a chassis equipped with a battery box, and a hinged or pivotally mounted motorman's compartment or platform carried by said chassis and adapted to be arranged in an operative position wherein it forms an extension at one end of said chassis and in an inoperative position wherein it laps over said battery box.

4. A storage battery locomotive provided at one end with a shiftable or movable portion that is adapted to serve as a supporting structure for the motorman and as a part to which a draw bar can be connected.

5. A storage battery locomotive, comprising a chassis, a shiftable element on said chassis that can be extended beyond one end of same and retracted when it is not in use, and means for enabling a draw bar to be connected to said element.

6. A storage battery locomotive, comprising a chassis, a shiftable motorman's compartment or platform that is adapted to be extended beyond one end of the chassis of the locomotive when it is in use and arranged in superimposed relation with the chassis when it is not in use, and means for holding said compartment rigid with respect to the chassis of the locomotive when said compartment is in use.

7. A storage battery locomotive, comprising a chassis, brackets or uprights at one end of said chassis, and a shiftable motorman's compartment or platform pivotally mounted on said uprights.

8. A storage battery locomotive, comprising a chassis provided with a battery box, uprights at one end of said chassis, and a shiftable motorman's compartment or platform pivotally mounted on said uprights and constructed in such a way that it can be swung upwardly into overlapping relation with said battery box.

9. A storage battery locomotive provided at one end with a movable motorman's compartment or platform that comprises side members connected to a floor and to an end sill and provided with upwardly-projecting arms that are hinged or pivotally connected to the chassis of the locomotive.

10. A storage battery locomotive, comprising a chassis equipped with a battery box, a shiftable element at one end of said chassis that is adapted to act as a supporting structure for the motorman, an end sill on said element, and means for enabling a draw bar to be detachably connected to said end sill.

11. A storage battery locomotive, comprising a chassis having a frame, brackets or uprights at one end of said frame, a motorman's compartment having a floor arranged in a lower horizontal plane than the frame of said chassis, and side members projecting upwardly from said floor and pivotally connected at their upper ends to said brackets, thereby enabling said compartment to be swung upwardly into superimposed relation with the frame of said chassis.

12. A storage battery locomotive, comprising a chassis, a motorman's compartment or platform pivotally mounted on said chassis and arranged on one end of same, and a locking pin that is adapted to be inserted in aligned holes in co-operating devices on said chassis and compartment when said compartment is arranged in its operative position.

RAYMOND MANCHA.